United States Patent
Sundaram et al.

(10) Patent No.: US 8,512,443 B2
(45) Date of Patent: Aug. 20, 2013

(54) HYDROGEN UTILIZATION WITHIN A REFINERY NETWORK

(75) Inventors: Narasimhan Sundaram, Fairfax, VA (US); John W. Viets, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 221 days.

(21) Appl. No.: 13/013,295

(22) Filed: Jan. 25, 2011

(65) Prior Publication Data

US 2011/0185898 A1 Aug. 4, 2011

Related U.S. Application Data

(60) Provisional application No. 61/337,058, filed on Jan. 29, 2010.

(51) Int. Cl.
*B01D 53/22* (2006.01)
*B01D 53/047* (2006.01)

(52) U.S. Cl.
USPC ............ 95/55; 95/96; 95/98; 95/141; 95/143; 95/148; 96/4; 96/130; 96/134; 96/143

(58) Field of Classification Search
USPC .................. 95/55, 56, 96, 98, 105, 117, 141, 95/143, 148; 96/4, 121, 130, 134, 143
See application file for complete search history.

(56) References Cited

U.S. PATENT DOCUMENTS

| | | | |
|---|---|---|---|
| 4,398,926 A | | 8/1983 | Doshi |
| 4,689,062 A | * | 8/1987 | MacLean et al. ................. 95/55 |
| 4,690,695 A | * | 9/1987 | Doshi ............................... 95/55 |
| 6,179,900 B1 | * | 1/2001 | Behling et al. .................... 95/55 |
| 6,911,066 B2 | * | 6/2005 | Monereau ......................... 95/96 |
| 7,591,879 B2 | | 9/2009 | Sundaram et al. |
| 7,763,098 B2 | * | 7/2010 | Alizadeh-Khiavi et al. ...... 95/96 |
| 2005/0056149 A1 | * | 3/2005 | Bayreuther ........................ 95/96 |
| 2009/0120839 A1 | | 5/2009 | Sabottke et al. |

FOREIGN PATENT DOCUMENTS

| | | | |
|---|---|---|---|
| DE | 43 24 526 A1 | * | 1/1995 |
| DE | 4324526 | | 1/1995 |
| EP | 2141119 | | 6/2010 |
| FR | 2 836 058 | * | 8/2003 |
| FR | 2836058 | | 8/2003 |
| WO | 2008017781 | | 2/2008 |

OTHER PUBLICATIONS

English language machine translation for FR 2 836 058.*
English language machine translation for DE 43 24 526 A1.*
English Language Machine Translation of FR 2 836 058, 10 pages, no date.*

* cited by examiner

*Primary Examiner* — Jason M Greene
(74) *Attorney, Agent, or Firm* — David M. Weisberg; Bruce M. Bordelon

(57) ABSTRACT

Hydrogen can be recovered in a refinery network using a combination of a cycling adsorber unit and a membrane separation unit. A membrane separation unit can be used to generate at least a portion of the purge hydrogen stream for the cycling adsorber unit. This can reduce the portion of the hydrogen product stream from the cycling adsorber unit required for regeneration of the adsorbent.

22 Claims, 2 Drawing Sheets

HYDROGEN UTILIZATION WITHIN A REFINERY NETWORK

This Application claims the benefit of U.S. Provisional Application No. 61/337,058, filed Jan. 29, 2009, which is hereby incorporated by reference herein in its entirety.

FIELD OF THE INVENTION

Systems and methods are provided relating to hydrogen utilization within a refinery.

BACKGROUND OF THE INVENTION

Hydrogen is an important resource in the refining of crude oils and other hydrocarbon fractions. Refinery processes such as hydrotreatment, hydrocracking, and catalytic dewaxing, are dependent on the availability of hydrogen at a sufficiently high pressure as well as a sufficiently high purity.

Unfortunately, refineries tend to be net consumers of hydrogen. While processes such as reforming can result in generation of additional hydrogen, a typical refinery has greater demand for hydrogen than is available from processes in the refinery that generate hydrogen. External sources of hydrogen can be brought in to a refinery to make up the shortfall. However, such external hydrogen is usually expensive, so any savings in the amount of external hydrogen consumed is beneficial.

One potential way to reduce the amount of external hydrogen that is needed is to improve the use and recovery of hydrogen within a refinery. Refinery processes are typically performed using an excess of hydrogen, so that some hydrogen remains as an effluent or other product that exits a reactor. However, this hydrogen will typically have a higher level of impurities. Purifying and/or pressurizing this recycled hydrogen for use in the refinery can result in significant costs.

U.S. Pat. No. 4,398,926 describes a method for separating hydrogen from impurities using both a pressure swing adsorber unit and a membrane separator. The initial hydrogen-containing feed is passed through the membrane to produce a hydrogen enriched permeate and a retentate. The hydrogen enriched permeate is used as the feed gas to the pressure swing adsorber for producing a hydrogen product stream. When the pressure swing adsorber unit has reached the end of an adsorption step, the retentate from the membrane is co-fed through the adsorber unit to help sweep out the hydrogen product still in the unit.

U.S. Patent Application Publication No. 2009/0120839 describes systems and methods for hydrogen management for hydroprocessing units. The hydrogen management techniques include use of rapid cycle pressure swing adsorber units for recovery of hydrogen from the gaseous effluents of hydroprocessing units.

U.S. Pat. No. 7,591,879 describes systems and methods for employing rapid cycle pressure swing adsorber units in a refinery setting, such as in conjunction with hydroprocessing equipment.

SUMMARY OF THE INVENTION

One aspect of the invention relates to a method for recovery of hydrogen in a refinery, comprising: providing a first hydrogen stream having a hydrogen content of about 90% or less by volume and having a pressure from about 145 psig (about 1.0 MPag) to about 870 psig (about 6.0 MPag); providing a second hydrogen stream having a hydrogen content of about 90% or less by volume at a pressure of at least about 580 psig (about 4.0 MPag); performing a membrane separation on the second hydrogen stream to produce a hydrogen permeate stream having a hydrogen content of at least about 99.0% by volume, the hydrogen permeate stream having a pressure of about 100 psig (about 0.7 MPag) or less; exposing the first hydrogen stream to an adsorbent in a cycling adsorber unit to produce a hydrogen product stream having a hydrogen content of at least about 99.0% by volume and a pressure of at least about 90% of the pressure of the first hydrogen stream; contacting the adsorbent with the hydrogen permeate stream to regenerate the adsorbent; forming a tail gas stream at least in part from the hydrogen permeate stream after contact with the adsorbent; and compressing the tail gas stream to have a pressure greater than about 100 psig (about 0.7 MPag).

Another aspect of the invention relates to a method for recovery of hydrogen in a refinery, comprising: receiving a hydrogen-containing effluent from a reforming unit, the reforming unit effluent having a hydrogen content of about 90% or less by volume; contacting the reforming unit effluent with an adsorbent in a cycling adsorber unit to produce a hydrogen product stream having a hydrogen content of at least about 99.0% by volume and having a pressure of at least about 95% of a pressure of the reforming unit effluent, preferably at least about 98%; receiving a gas phase effluent from a hydroprocessing unit, the hydroprocessing unit effluent having a hydrogen content of about 90% or less by volume; performing a membrane separation on the hydroprocessing unit effluent to produce a hydrogen permeate stream and a retentate stream, the hydrogen permeate stream having a hydrogen content of at least about 99.0% by volume, preferably at least about 99.1% by volume, and a pressure of about 100 psig (about 0.7 MPag) or less; and contacting the adsorbent with the hydrogen permeate stream to regenerate the adsorbent.

DETAILED DESCRIPTION OF THE EMBODIMENTS

Overview

Figure 1A:
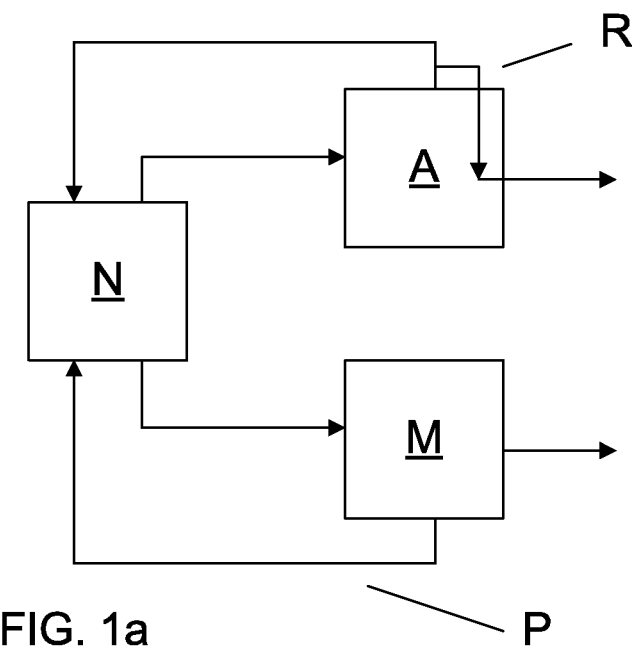
FIG. 1 schematically shows an example of hydrogen recovery in a hydrogen network.

In various embodiments, systems and methods are provided to improve hydrogen recovery within a refinery. As an illustrative example, a refinery network that includes both sources and consumers of hydrogen can generate at least two streams containing hydrogen whose recovery and reuse is desirable. Each of these two streams can be available over a range of pressures. For example, one stream may be available at a pressure from about 870 psig (about 6.0 MPag) to about 1450 psig (about 10.0 MPag) while the other stream may be available at about 145 psig (about 1.0 MPag) to about 580 psig (about 4.0 MPag). In an embodiment, the difference in the pressures of these two streams can be as large as possible.

In an illustrative example, the higher pressure effluent can be passed to a membrane separation unit. The lower pressure effluent can be sent to a cycling adsorber unit, such as a pressure swing adsorber unit (PSA), a rapid cycle pressure swing adsorber unit (RCPSA), or a temperature swing adsorber unit (TSA). The membrane separation unit can be operated so as to produce an $H_2$ rich product (~99.0 vol % purity) by allowing almost complete depressurization across the membrane. Subsequently, this $H_2$ can be used as a low pressure purge for the cycling adsorber unit, in place of using the higher pressure $H_2$ generated by the cycling adsorber unit. Using a low pressure, high purity $H_2$ stream generated from a membrane unit as the purge for a cycling adsorber unit can provide a substantial reduction in non-$H_2$ molecules sent back to the network, as compared to a configuration where the membrane permeate is returned to the hydrogen network. The reduction in non-$H_2$ molecules in the hydrogen network can be about 10% to about 20% or more, which can improve the operation and/or capacity of a refinery hydrogen delivery and recycling network. Optionally, the membrane permeate gas can be heated before introduction into the cycling adsorber, such as on an intermittent basis, to periodically improve cleaning of the adsorbents in the cyclic adsorber and increase operational life.

More generally, any refinery stream that includes hydrogen for recovery can be used as the input stream for either the cycling adsorber unit or the membrane unit. Thus, the hydrogen stream delivered to the cycling adsorber unit can have a pressure that is higher than the stream delivered to the membrane unit, or a pressure that is lower, or a pressure that is similar.

In various embodiments, systems and methods according to the invention can provide one or more of the following advantages. In some embodiments, the total amount of hydrogen recovered at a given pressure can be increased. This can provide a benefit of increasing the amount of hydrogen used for hydrogen processing, as opposed to allowing the hydrogen to be lost to a lower value use, such as fuel gas. Additionally or alternately, the purity of recycled hydrogen can be improved. This can be reflected in the amount of non-$H_2$ molecules returned to the hydrogen network. Improving the purity of the hydrogen returned to the network can be beneficial because some refinery processes are sensitive to impurities in an input hydrogen stream. Further additionally or alternately, a recovered hydrogen stream can be produced at a higher pressure, thus reducing the costs for compression of the hydrogen prior to use in a refinery process.

In various embodiments, systems and methods according to the invention can also provide advantages relative to conventional configurations that include both a cycling adsorber unit and a membrane. During operation in a refinery, a cycling adsorber unit for hydrogen recovery can typically produce a hydrogen product stream and a tail gas. The hydrogen product stream can typically be at a pressure comparable to other processing pressures in a refinery, and therefore may need little or no compression to be used and/or to be returned to the hydrogen network. However, the tail gas stream can typically be at a pressure too low for use in the refinery. The tail gas stream can be produced during the portions of the cycle when the cycling adsorber unit is being purged to regenerate the adsorbent. The reduction in pressure needed to desorb contaminants from the adsorbent can result in a tail gas stream at a lower pressure. Even for a low value use such as fuel gas, the tail gas stream typically needs to be compressed in order to be added to a refinery process.

A membrane separation process for hydrogen recovery can also typically produce two streams. The membrane can typically produce a permeate stream enriched in hydrogen and a retentate stream. For a membrane separation, the retentate stream can typically be at a suitable pressure for use in the refinery. However, the permeate stream can typically be reduced in pressure. If the membrane is operated to maintain a pressure suitable for further use in the refinery for the permeate, the resulting permeate stream can typically contain a higher percentage of impurities. Achieving a hydrogen purity comparable to the hydrogen product stream from a cycling adsorber unit can typically require reducing the pressure of the hydrogen permeate stream to below a useful pressure for refinery processes. This means that a compression step can typically be required to have the membrane generate a permeate stream with a purity and a pressure comparable to the hydrogen product stream of a cycling adsorber unit. Thus, in a situation where it is desirable to use both a membrane unit and a cycling adsorber unit to recover hydrogen, at least two compressors may be necessary to make use of all of the streams generated by the units.

Systems and methods according to the invention can employ both a cycling adsorber unit and a membrane separation unit for production of high purity, high pressure hydrogen while requiring only one compressor. In an embodiment, the cycling adsorber unit can generate a hydrogen product stream at a desirable refinery pressure and a tail gas stream. The purge gas used to produce the tail gas stream can be provided, at least in part, by the permeate from a membrane separation process. The membrane permeate hydrogen stream can be used in place of depressurizing a portion of the hydrogen product stream for use as a purge gas. Because the purge process for the cycling adsorber unit generally occurs at a relatively low pressure, a relatively high purity but relatively low pressure hydrogen permeate stream can be used for the purge without compression. This can advantageously eliminate the need for a compressor to raise the pressure of a relatively high purity hydrogen stream generated by a membrane separation unit.

FIG. 1 schematically shows the difference between a conventional configuration and a configuration according to the invention. In FIG. 1a, a refinery hydrogen network is represented by N. The network N can represent a plurality of various types of hydrogen sources and hydrogen consumers. These can include hydroprocessing units, reforming units, and other processes involved with hydrogen production/consumption in a refinery. The network N can include hydrogen streams with various levels of hydrogen purity. For example, the input stream to a hydroprocessing unit can (likely will) be at a higher level of hydrogen purity than the gaseous effluent from that unit.

Also in FIG. 1a, one stream from the network N is routed to a cycling adsorption unit A for hydrogen recovery. A second stream from network N is routed to a membrane unit M for hydrogen recovery. FIG. 1a shows a conventional configuration, where both the hydrogen product stream from cycling adsorption unit A and the permeate stream P from membrane M can be returned to the network N. Both cycling adsorption unit A and membrane M can also produce a stream depleted in hydrogen (such as a tail gas or a retentate stream) that can be removed the hydrogen network. Note that, for cycling adsorption unit A, a return loop R is shown that diverts a portion of the product stream back to the cycling adsorption unit. The loop R represents the flow path for hydrogen produced by cycling adsorption unit A that is consumed by the unit in order to regenerate the adsorbent. As shown in FIG. 1a, this stream can exit the network as part of the tail gas from cycling adsorption unit A.

Figure 1B:
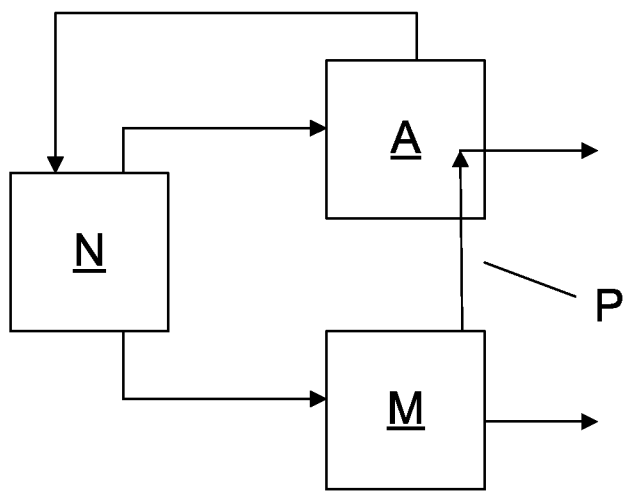

FIG. 1b shows an example of a configuration according to the invention. In FIG. 1b, the permeate stream P from membrane M is not returned to network N, instead being used as the purge stream for cycling adsorption unit A.

Sources of Hydrogen

In an embodiment, the input hydrogen streams processed according to the invention can originate from any suitable refinery process. Refineries typically include a number of hydroprocessing units, such as hydrotreatment, hydrocracking, and/or hydroisomerization units. Each hydroprocessing unit can typically produce a gas phase effluent that contains unreacted hydrogen. The gas phase effluent can also contain one or more contaminant gases, such as $H_2S$, $NH_3$, relatively low boiling hydrocarbons (such as those typically present in LPG), and other molecules that are gas phase at refinery process temperatures and pressures.

Another potential source of hydrogen in a refinery can be from processes that generate hydrogen as a product. A reaction for reforming naphtha to improve gasoline octane is an example of a process that can generate additional hydrogen. Some coking processes can also generate additional hydrogen. An off-gas stream containing hydrogen produced from a refinery process can also contain contaminants, so purification of the off-gas stream can be beneficial.

Membrane Purification of Hydrogen

One method for purification of a hydrogen stream includes use of a membrane to produce a permeate and a retentate. Either the permeate or the retentate can include a phase enriched in hydrogen, depending on the type of membrane used. In many of the embodiments described herein, membranes that selectively allow hydrogen to pass through to the permeate are preferred.

For membrane systems that selectively allow hydrogen to pass through into a permeate, a pressure drop can tend to occur across the membrane. Typically, the efficiency of the separation can correlate with the amount of pressure drop. Thus, allowing a higher pressure drop to occur across the membrane can lead to production of a higher purity hydrogen permeate.

One type of a membrane suitable for hydrogen separation and recovery in a refinery setting is a PRISM® membrane available from Air Products of Allentown, Pa. More generally, a variety of membrane types can be suitable for hydrogen separation, such as polymeric membranes, ceramic membranes, palladium-based membranes, and the like, and separate (series or parallel) or layered combinations thereof.

In an embodiment, the input stream to a membrane unit for hydrogen separation can have a total pressure of at least about 580 psig (about 4.0 MPag), for example at least about 870 psig (about 6.0 MPag), at least about 1160 psig (about 8.0 MPag), or at least about 1450 psig (about 10.0 MPag). The input stream can have a total pressure up to any convenient pressure found within a refinery. Thus, additionally or alternately, the input stream can have a total pressure of about 2200 psig (about 15.2 MPag) or less, for example about 1800 psig (about 12.4 MPag) or less, about 1450 psig (about 10.0 MPag) or less, about 1160 psig (about 8.0 MPag) or less, or about 870 psig (about 6.0 MPag) or less. The hydrogen content (or purity) of an input stream to a membrane separation unit can be at least about 60% by volume, for example at least about 65 vol %, at least about 75 vol %, or at least about 85 vol %.

As mentioned earlier, during operation, a hydrogen separation membrane unit can typically produce a permeate hydrogen stream and a retentate stream. The pressure of the permeate hydrogen stream from the membrane separation unit can be about 100 psig (about 0.7 MPag) or less, for example about 75 psig (about 0.5 MPag) or less, about 60 psig (about 0.4 MPag) or less, or about 45 psig (about 0.3 MPag) or less. The hydrogen content (or purity) of the permeate stream can be at least about 99.0% by volume, for example at least about 99.1% by volume, at least about 99.3% by volume, or at least about 99.5% by volume. The pressure of the retentate stream can be similar to the pressure of the input stream for the membrane separator. In an embodiment, the pressure of the retentate stream can be at least about 90% of the input pressure, for example at least about 95% or at least about 98%. During a membrane separation, a substantial portion of the hydrogen in the input stream can be separated into the permeate stream. The remaining hydrogen can remain in the retentate. In an embodiment, the permeate can include at least about 86% by volume of the hydrogen from the input stream, for example at least about 89% by volume or at least about 90% by volume.

Pressure Swing Adsorption for Hydrogen Purification

Another method for removing contaminants from a hydrogen stream is by using a cycling adsorber, such as a pressure swing adsorber unit or a temperature swing adsorber unit. In pressure swing adsorption (PSA), a gaseous mixture can be conducted under pressure for a period of time over a first bed of a solid sorbent. The sorbent can advantageously be selective (or at least relatively selective) for one or more components, usually regarded as a contaminant that is to be removed from the gas stream. It is possible to remove two or more contaminants simultaneously, but, for convenience, the component or components that are to be removed will be referred to in the singular and referred to as a contaminant. Alternately, the sorbent may be (relatively) selective for one or more components that are desired to be isolated, instead of a contaminant. The skilled person should understand how to modify the disclosure herein to adjust for isolation of one or more desired compounds, as opposed to one or more contaminants (as presented below).

In an embodiment, a pressure swing cycle can include a feed step, at least one depressurization step, a purge step, and a repressurization step to prepare the adsorbent material for reintroduction of the feed. The sorption of the contaminants usually takes place by physical adsorption, though (relatively) easily reversible chemical adsorption/absorption is alternately contemplated. The sorbent can typically comprise or consist essentially of a porous solid such as alumina, silica, silica-alumina, or the like, that has an affinity for the contaminant. Zeolites can additionally or alternately be used in many applications, since they may exhibit a significant degree of selectivity for certain contaminants, by virtue of their controlled/predictable pore sizes. Normally, chemical reaction with the sorbent is not favored in view of the increased difficulty of achieving desorption of species which have become chemically bound to the sorbent. However, chemisorption of a contaminant can result if the adsorbed material(s) may be effectively desorbed during the desorption portion of the cycle, e.g., by the use of higher temperatures coupled with the reduction in pressure.

In typical operation, a gaseous mixture can be passed over a first adsorption bed in a first vessel. The gaseous mixture can emerge from the bed depleted in the contaminant that remains adsorbed in/by the bed. This gaseous mixture can advantageously correspond to the desired product stream, such as a hydrogen product stream, but, in other embodiments, it can correspond to the contaminant stream to be separated from the desired component(s) that are adsorbed, with understandable manipulation of the following disclosure. After a predetermined time or, alternately when a break-through of the contaminant is observed, the flow of the gaseous mixture can be switched to a second adsorption bed in a second vessel for the purification to continue. While the second bed is in adsorption service, the adsorbed contaminant can be removed from the first adsorption bed, e.g., by a reduction in pressure, usually accompanied by a reverse flow of gas to desorb the contaminant. As the pressure in the vessels is reduced, the contaminant previously adsorbed on the bed can progressively be desorbed and can exit the cycling adsorber unit as a tail gas. The tail gas can be received by a tail gas system, such as a system that includes a tail gas drum and a control system designed to minimize pressure fluctuations to downstream systems. The contaminant can be collected from the tail gas system in any suitable manner and can be processed further or disposed of, as appropriate.

When desorption is (substantially) complete, the sorbent bed may be purged with an inert gas stream. Conventionally, this inert gas stream can often be drawn from the purified stream of the process gas generated by the cyclic adsorber unit. This conventional scenario has the disadvantage of using a relatively high pressure, relatively high purity gas for a low pressure purge. The sorbent bed can then be repressurized to allow for the start of another cycle. Any effluent generated during the purge and repressurization steps in a cycle can also form part of the tail gas.

After, e.g., breakthrough in the second bed, and after the first bed has been regenerated so that it is again prepared for adsorption service, the flow of the gaseous mixture can be switched from the second bed to the first bed, and the second bed can be regenerated. The total cycle time is the length of time from when the gaseous mixture is first conducted to the first bed in a first cycle to the time when the gaseous mixture is first conducted to the first bed in the immediately succeeding cycle, i.e., after a single regeneration of the first bed. The use of third, fourth, fifth, etc. vessels in addition to the second vessel, as might be needed when adsorption time is short but desorption time is long, can serve to increase the total cycle time.

In an embodiment, the input stream to a cycling adsorber unit for hydrogen recovery can have a total pressure of at least about 145 psig (about 1.0 MPag), for example at least about 360 psig (about 2.5 MPag), at least about 580 psig (about 4.0 MPag), at least about 870 psig (about 6.0 MPag), or at least about 1160 psig (about 8.0 MPag). Additionally or alternately, the input stream to a cycling adsorber unit can have a total pressure of about 1800 psig (about 12.4 MPag) or less, for example about 1450 psig (about 10.0 MPag) or less, about 1160 psig (about 8.0 MPag) or less, about 870 psig (about 6.0 MPag) or less, or about 580 psig (about 4.0 MPag) or less. Note that hydrogen streams of differing pressures may optionally be modified and/or combined prior to using a cycling adsorber unit and/or a membrane unit to remove contaminants. For instance, two hydrogen-containing streams may be available, e.g., with one at a pressure of about 870 psig (about 6.0 MPag) and the other at a pressure of about 1160 psig (about 8.0 MPag). Such streams can be combined in any convenient manner for processing. For example, the stream at higher pressure can be depressurized and combined with the lower pressure stream to form a single hydrogen stream at about 870 psig (about 6.0 MPag). This single combined stream can then be purified according to an embodiment of the invention.

During operation of a cycling adsorber unit, a purge stream can also be used during a portion of the operation cycle. The pressure of the purge stream delivered to the cycling adsorber unit can be about 100 psig (about 0.7 MPag) or less, for example about 75 psig (about 0.5 MPag) or less, about 60 psig (about 0.4 MPag) or less, or about 45 psig (about 0.3 MPag) or less.

A cycling adsorber unit can produce a product hydrogen stream. The pressure of the product hydrogen stream can typically be similar to, but usually lower than, the input pressure. The pressure of the product hydrogen stream can differ from the pressure of the input stream by about 50 psi (about 340 kPa) or less, for example about 30 psi (about 210 kPa) or less, about 10 psi (about 69 kPa) or less, or about 5 psi (about 34 kPa) or less. Additionally or alternately, the pressure of the hydrogen product stream can be at least about 90% of the input pressure, for example at least about 95%, at least about 98%, or at least about 99%. The hydrogen content (or purity) of the product hydrogen stream can be at least about 99% by volume (e.g., at least about 99.0% by volume), for example at least about 99.1% by volume, at least about 99.3% by volume, or at least about 99.5% by volume. Relative to the input stream, the hydrogen product stream can include at least about 80% by volume of the hydrogen from the input stream, for example at least about 85% by volume. Note that this amount of hydrogen recovery by a cycling adsorber unit represents the net amount of hydrogen recovered, after accounting for losses of hydrogen due to the need for depressurization, purge, and pressurization portions of the cycle. Conventionally, the hydrogen for these portions of the cycle is taken from the hydrogen produced by the cycling adsorber, thus reducing the amount of hydrogen recovery.

A cycling adsorber unit can also produce a tail gas stream. The tail gas stream includes the reduced pressure flows that are produced during the portions of the cycle that regenerate the adsorbent. The pressure of the tail gas stream can be similar to the pressure of the purge stream. The pressure of the tail gas stream can be about 100 psig (about 0.7 MPag) or less, for example about 75 psig (about 0.5 MPag) or less, about 60 psig (about 0.4 MPag) or less, or about 45 psig (about 0.3 MPag) or less.

Integration of Membrane and Cycling Adsorber Units

In various embodiments, hydrogen recovery can be improved by using the permeate product from a membrane separation as the purge gas for a cycling adsorber unit. This can increase the amount of the hydrogen product from the cycling adsorber available for recovery. Instead of using the hydrogen product from the cycling adsorber unit for the purge step, the hydrogen permeate product from the membrane unit can be used. Since the purge is also typically performed at a reduced pressure, the pressure of the hydrogen permeate product generally does not need to be increased to be used as a purge gas.

In an embodiment, the input feeds to the cycling adsorber unit and the membrane unit can be feeds from different hydrogen-containing streams in a refinery network. For example, the input feed to the cycling adsorber unit can be an off-gas stream generated by a reforming unit, a coking unit, an FCC unit, or another refinery process that generates hydrogen. The feed to the membrane unit can be a gaseous effluent from a hydroprocessing unit, for example. More generally, any combination of different hydrogen-containing streams can be used for the feed to the cycling adsorber or the membrane, so long as the net input feed to each unit is suitable for producing the desired product.

Alternately, the feed to both the cycling adsorber unit and the membrane unit could be generated by a single source. Such a feed could be split into separate inputs for the cycling adsorber unit and the membrane unit. One potential reason for using this type of configuration would be to improve the overall recovery of hydrogen at a desired pressure. A membrane unit may be able to recover a greater percentage of the hydrogen within an input stream, although the recovered stream may be at a lower relative pressure. Since a relatively low pressure hydrogen stream can be used for the purge step in a cycling adsorber, a membrane can provide a more efficient method for generating a hydrogen purge stream. Additionally, a cycling adsorber unit may have a moderate increase in hydrogen recovery efficiency as the total flow through the unit is decreased.

Because the use of a membrane permeate gas for purging can allow for additional recovery of hydrogen from a cycling adsorber unit, the yield of hydrogen for the combined cycling adsorber unit and membrane unit should preferably be at least comparable to the hydrogen yield when a cycling adsorber unit and a membrane unit are used to separately recover hydrogen. When considering the amount of hydrogen recovered, an appropriate starting point can be to consider the total input to both the cycling adsorber unit and the membrane unit. The combination of the hydrogen flow rate into the cycling adsorber unit(s) plus the hydrogen flow rate into the membrane unit(s) can be considered a total hydrogen input rate. In an embodiment, the recovered hydrogen is the hydrogen in the product stream from the cycling adsorber unit. The volumetric hydrogen flow rate in the hydrogen product stream can be at least about 80% of the total hydrogen input rate, preferably at least about 85%. For purposes of determining a flow rate, if the operation of the cycling adsorber unit results in variations in flow rate during a cycle, the flow rate can be determined over multiple cycles to provide an average value.

In some embodiments, purging may be facilitated by the use of a purge gas stream that is at a higher temperature relative to the sorbent bed(s). The purge gas stream can have a constant temperature during all purge steps, or the temperature of the purge gas stream can vary, so that some purge steps have a higher temperature, e.g., to facilitate a more thorough purge.

Figure 2:
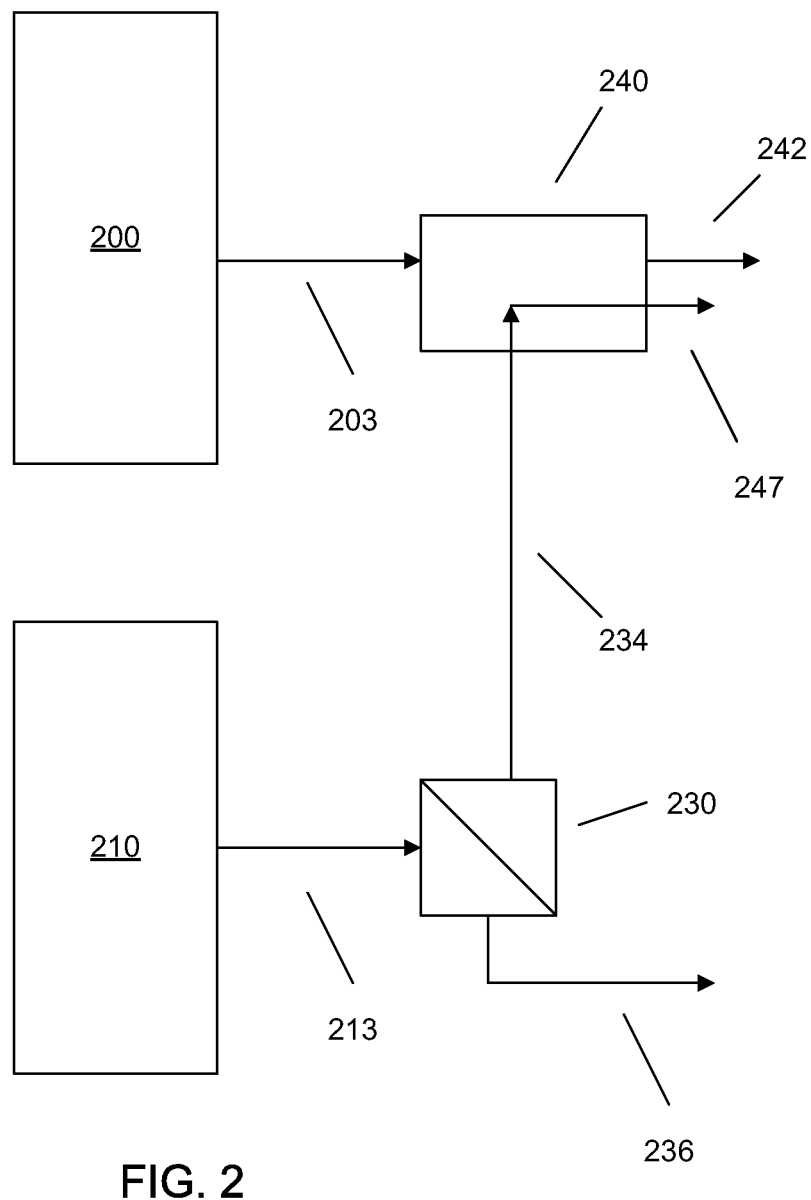
FIG. 2 schematically shows an example of using a cycling adsorber unit and a membrane unit for hydrogen recovery from refinery processes.

FIG. 2 schematically shows an example of a portion of a refinery network configured according to the invention. In FIG. 2, typical refinery process units are represented by reforming unit 200 and hydrocracking unit 210. Other types of refinery units can include cokers, hydrotreaters, hydroisomerization units, other hydroprocessing units, and/or other refinery units that can generate a gaseous effluent having a hydrogen content of at least about 55% by volume. According to FIG. 2, reforming unit 200 produces gaseous effluent 203 while hydrocracking unit 210 produces gaseous effluent 213. Gaseous effluent 203 can be passed to cycling adsorber unit 240 for purification. The cycling adsorber unit can be a pressure swing adsorption unit, a temperature swing adsorption unit, or a rapid cycle pressure swing adsorption unit. Gaseous effluent 213 can be passed to a membrane unit 230 for purification. Membrane unit 230 can produce hydrogen permeate stream 234 and retentate stream 236. Retentate stream 236 can be at a suitable pressure to be used in another refinery process, such as being burned as fuel gas. Hydrogen permeate stream 234 can be delivered to cycling adsorber unit 240, e.g., for use as a purge gas. During operation, cycling adsorber unit 240 can remove contaminants from gaseous effluent 203 to produce hydrogen product stream 242. Preferably, hydrogen product stream 242 can have a hydrogen content of at least about 99% by volume. Hydrogen product stream 242 can be delivered to another refinery processing unit, or can be added to the refinery hydrogen network for distribution. During the portion of the cycle when the adsorbent is purged, hydrogen permeate stream 234 can be used to purge the adsorbent. Optionally, a portion of hydrogen product stream 242 may be used (not shown) to supplement the hydrogen permeate stream for the purge. The hydrogen product stream can also optionally be used during the depressurization and repressurization portions of the cycle. The effluent from the purge and depressurization/repressurization steps can form a tail gas 247.

Other Types of Cycling Adsorber Units

Other types of cycling adsorber units can be used instead of a pressure swing adsorber. For example, a temperature swing adsorber unit can operate in a manner similar to a pressure swing unit. Instead of using pressure as the primary driver for sorption and desorption of contaminants, a temperature swing adsorption (TSA) process can use temperature as the primary variable for controlling contaminant sorption and desorption. It is noted that pressure changes can also be used in a TSA unit to further control contaminant removal, and similarly temperature changes can be used in a PSA unit.

Another option for the cycling adsorber unit is to use a rapid cycle pressure swing adsorber. A conventional pressure swing adsorption unit generally has cycle times on the order of minutes. This is due in part to the amount of time required to allow diffusion of the components through the beds utilized in conventional PSA, as well as the equipment configuration and valving involved. An alternative to a conventional PSA process is rapid cycle pressure swing adsorption (RCPSA). An RCPSA unit can have cycle times of less than one minute. The total cycle times may be less than 30 seconds, for example less than 15 seconds, less than 10 seconds, less than 5 seconds, or less than 2 seconds.

In some embodiments, an RCPSA unit can make use of substantially different sorbents, such as, but not limited to, structured materials such as monoliths. Conventional PSA can tend to rely on particulate adsorbents. Due to construction constraints, a conventional PSA unit is usually comprised of 2 or more separate beds that cycle, so that at least one or more beds can fully or at least partially be in the feed portion of the cycle at any one time, in order to limit disruptions or surges in the treated process flow. However, due to the relatively large size of conventional PSA equipment, the particle size of the adsorbent material is typically limited to particle sizes (e.g., equivalent spherical diameter) of about 1 mm and above.

An RCPSA unit can utilize a rotary valving system to conduct the gas flow through a rotary sorber module or a non-rotary sorber module. In embodiments involving a rotary sorber module, the rotary sorber module can contain a number of separate compartments, each of which can be successively cycled through the sorption and desorption steps as the rotary module completes the cycle of operations. The rotary sorber module can be composed of tubes held between two seal plates on either end of the rotary sorber module. The seal plates can be in contact with a stator comprised of separate manifolds, in which the inlet gas can be conducted to the RCPSA tubes and in which processed purified product gas and the tail gas exiting the RCPSA tubes can be conducted away from rotary sorber module. By suitable arrangement of the seal plates and manifolds, a number of individual compartments may be passing through the characteristic steps of the complete cycle at any one time. In contrast with conventional PSA, the flow and pressure variations required for the RCPSA sorption/desorption cycle may be changed in a number of separate increments on the order of seconds per cycle, which can smoothe out the pressure and flow rate pulsations encountered by the compression and valving machinery. In this form, the RCPSA module can include valving elements angularly spaced around the circular path taken by the rotating sorption module, so that each compartment can be successively passed to a gas flow path in the appropriate direction and pressure to achieve one of the incremental pressure/flow direction steps in the complete RCPSA cycle. A non-rotary or non-moving sorber module can also contain a number of separate compartments. Each of the separate compartments can be successively cycled through adsorption and desorption (as well as purge) steps. Each of the separate compartments can be in fluid communication with a fixed port providing gas in a cyclic manner as part of a rotary valving apparatus, similar to the rotary embodiment described above. A non-rotary or non-moving sorber module can be beneficial as the mass of the sorbent bed increases.

One advantage of RCPSA technology includes the potential for more efficient use of the adsorbent material. In some embodiments, the quantity of adsorbent required with RCPSA technology can be only a fraction of that required for conventional PSA technology to achieve the same separation quantities and qualities. Thus, the footprint, investment, and amount of active adsorbent required for RCPSA can be significantly lower than for a conventional PSA unit processing an equivalent amount of gas.

In an embodiment, RCPSA bed length unit pressure drops, required adsorption activities, and mechanical constraints (e.g., due to centrifugal acceleration of the rotating beds in RCPSA) may inhibit and/or prevent the use of many conventional PSA adsorbent bed materials. In particular, adsorbents that are in a loose pelletized, particulate, beaded, or extrudate form may not be usable in an RCPSA bed. In a preferred embodiment, adsorbent materials can be secured to a supporting understructure material for use in an RCPSA rotating apparatus. For example, one embodiment of the rotary RCPSA apparatus can be in the form of sheets comprising adsorbent material coupled to a structured reinforcement material. A suitable binder may be used to attach the adsorbent material to the reinforcement material. Non-limiting examples of reinforcement material can include monoliths, mineral fiber matrices (such as glass fiber matrices), metal wire matrices (such as wire mesh screens), metal foil (such as aluminum foil), which can be anodized, and the like, and combinations thereof. Examples of glass fiber matrices can include woven and non-woven glass fiber scrims. The adsorbent sheets can be made, e.g., by coating a slurry of suitable adsorbent component, such as zeolite crystals with binder constituents onto the reinforcement material, such as non-woven fiber glass scrims, woven metal fabrics, and expanded aluminum foils. In a particular embodiment, adsorbent sheets or material can be coated onto a ceramic support.

An adsorber in a RCPSA unit typically comprises an adsorbent solid phase formed from one or more adsorbent materials and a permeable phase (space) through which the gases to be separated can flow from the inlet to the outlet of the adsorber, the components to be removed typically being fixed on the solid phase as the gases pass through the permeable phase. This permeable phase can also/alternately be called "circulating gas phase" or "gas phase". The solid phase can advantageously include a network of pores, the mean size of which can usually be between about 0.02 µm and about 20 µm. There may be a network of even smaller pores, termed "micropores", this being encountered, for example, in microporous carbon adsorbents and/or zeolites. The phenomenon of adsorption comprises two main steps, namely passage of the adsorbate through the circulating gas phase and onto the surface of the solid phase, followed by passage (diffusion) of the adsorbate from the surface to the volume of the solid phase into the adsorptive material.

In an embodiment, RCPSA can utilize a structured adsorbent incorporated into tubes in the RCPSA apparatus. Such a structured adsorbent can have an unexpectedly high mass transfer rate, since the gas flow is through the channels formed by the structured sheets of the adsorbent, which can offer a significant improvement in mass transfer as compared to a traditional packed fixed bed arrangement as utilized in conventional PSA. The ratio between the transfer rate of the gas phase ($\tau_g$) and the mass transfer rate of the solid phase ($\tau_s$) in the current invention can be greater than 10, for example greater than 25 or greater than 50.

The structured adsorbent embodiment can also result in significantly greater pressure drops to be achieved through the adsorbent than in conventional PSA, preferably without the detrimental effects typically associated with particulate bed technology. The adsorbent beds can be designed with adsorbent bed unit length pressure drops of greater than 5 inches of water per foot of bed length (4 kPa/m), preferably greater than 10 in. H$_2$O/ft (8 kPa/m), for example greater than 20 in. H$_2$O/ft (16 kPa/m). This is in contrast with conventional PSA units, where the adsorbent bed unit length pressure drops are generally limited to below about 5 in. H$_2$O/ft (4 kPa/m), depending upon the adsorbent used, with most conventional PSA units being designed with a pressure drop of about 1 in. H$_2$O/ft (0.8 kPa/m) or less, e.g., to minimize the problems associated with the larger beds, long cycle time, and particulate absorbents of conventional PSA units. The adsorbent beds of conventional PSA generally cannot accommodate higher pressure drops, because of the risk of fluidizing the beds, which can result in excessive attrition and premature unit shutdowns due to accompanying equipment problems and/or a need to add/replace lost adsorbent materials. These markedly higher adsorbent bed unit length pressure drops can allow RCPSA adsorbent beds to be significantly more compact, shorter, and more efficient than conventional PSA.

The achievement and accommodation of the high unit length pressure drops of the current embodiment can allow relatively high vapor velocities to be achieved across the structured adsorbent beds. This can result in a greater mass contact rate between the process fluids and the adsorbent materials per unit of time than can be achieved by conventional PSA. This can additionally or alternately result in shorter bed lengths, higher gas phase transfer rates ($\tau_g$), and improved hydrogen recovery. With significantly shorter bed lengths, total pressure drops of the RSCPA application can be maintained at total bed pressure differentials during the feed cycle from about 10 psig (about 70 kPag) to about 50 psig (about 350 kPag), preferably less than about 30 psig (about 210 kPag), while minimizing the active adsorbent beds to less than about 5 feet (about 1.5 m) in length, preferably less than about 2 feet (about 0.6 m) in length or less than about 1 foot (about 0.3 m) in length.

The absolute pressure levels employed during the RCPSA process are not necessarily critical, provided that the pressure differential between the adsorption and desorption steps is sufficient to cause a change in the adsorbate fraction loading on the adsorbent, thereby providing an incremental loading improvement (delta loading) effective for separating the stream components processed by the RCPSA unit. Typical pressure levels can range from about 50 psia (about 0.3 MPaa) to about 2000 psia (about 13.8 MPaa), for example from about 80 psia (about 0.6 kPaa) to about 500 psia (about 3.4 MPaa) during the adsorption step. However, it should be noted that the actual pressures utilized during the feed, depressurization, purge and repressurization stages can be highly dependent upon many factors including, but not limited to, the actual operating pressure and temperature of the overall stream to be separated, stream composition, and desired recovery percentage and purity of the RCPSA product stream.

In an embodiment, the rapid cycle pressure swing adsorption system can have a total cycle time, $t_{TOT}$, to separate a feed gas into product gas (in this case, a hydrogen-enriched stream) and a tail (exhaust) gas. The method can generally include the steps of conducting the feed gas having a hydrogen purity F %, where F is the percentage of the feed gas which is the (weakly) adsorbable (hydrogen) component, into an adsorbent bed that selectively adsorbs the tail gas and passes the hydrogen product gas out of the bed, for time, $t_F$, wherein the hydrogen product gas has a purity of P % and a rate of recovery of R %. Recovery R % represents the ratio of amount of hydrogen retained in the product to the amount of hydrogen available in the feed. Then the bed can be co-currently depressurized for a time, $t_{CO}$, followed by counter-currently depressurizing the bed for a time, $t_{CN}$, wherein desorbate (tail gas or exhaust gas) can be released from the bed at a pressure of at least 30 psig (210 kPag). The bed can then be purged for a time, $t_P$. In some embodiments, instead of using a portion of the hydrogen product gas, this purge can be accomplished using the hydrogen permeate product from the membrane separator. Subsequently the bed can be repressurized for a time, $t_y$, typically with a portion of hydrogen product gas or feed gas, wherein the cycle time, $t_{TOT}$, can be equal to the sum of the individual cycle times comprising the total cycle time according to the following equation.

$$t_{TOT} = t_F + t_{CO} + t_{CN} + t_P + t_{RP} \quad (1)$$

It should also be noted that it is within the scope of this invention that steps $t_{CO}$, $t_{CN}$, or $t_P$ of equation (1) above can be omitted together or in any individual combination. However, it is preferred that either all steps in equation (1) above be performed or that only one of steps $t_{CO}$ and $t_{CN}$ be omitted from the total cycle.

Additional Embodiments

Embodiment 1. A method for recovery of hydrogen in a refinery, comprising: providing a first hydrogen stream having a hydrogen content of about 90% or less by volume and having a pressure from about 145 psig (about 1.0 MPag) to about 870 psig (about 6.0 MPag); providing a second hydrogen stream having a hydrogen content of about 90% or less by volume at a pressure of at least about 580 psig (about 4.0 MPag); performing a membrane separation on the second hydrogen stream to produce a hydrogen permeate stream having a hydrogen content of at least about 99.0% by volume, the hydrogen permeate stream having a pressure of about 100 psig (about 0.7 MPag) or less; exposing the first hydrogen stream to an adsorbent in a cycling adsorber unit to produce a hydrogen product stream having a hydrogen content of at least about 99.0% by volume and a pressure of at least about 90% of the pressure of the first hydrogen stream; contacting the adsorbent with the hydrogen permeate stream to regenerate the adsorbent; forming a tail gas stream at least in part from the hydrogen permeate stream after contact with the adsorbent; and compressing the tail gas stream to have a pressure greater than about 100 psig (about 0.7 MPag).

Embodiment 2. The method of embodiment 1, wherein the first hydrogen stream is a reforming unit effluent and the second hydrogen stream is a hydroprocessing unit effluent.

Embodiment 3. A method for recovery of hydrogen in a refinery, comprising: receiving a hydrogen-containing effluent from a reforming unit, the reforming unit effluent having a hydrogen content of about 90% or less by volume; contacting the reforming unit effluent with an adsorbent in a cycling adsorber unit to produce a hydrogen product stream having a hydrogen content of at least about 99.0% by volume and having a pressure of at least about 95% of a pressure of the reforming unit effluent, preferably at least about 98%; receiving a gas phase effluent from a hydroprocessing unit, the hydroprocessing unit effluent having a hydrogen content of about 90% or less by volume; performing a membrane separation on the hydroprocessing unit effluent to produce a hydrogen permeate stream and a retentate stream, the hydrogen permeate stream having a hydrogen content of at least about 99.0% by volume, preferably at least about 99.1% by volume, and a pressure of about 100 psig (about 0.7 MPag) or less; and contacting the adsorbent with the hydrogen permeate stream to regenerate the adsorbent.

Embodiment 4. The method of any one of the preceding embodiments, further comprising pressurizing the cyclic adsorber unit using at least a portion of the hydrogen product stream.

Embodiment 5. The method of any one of the preceding embodiments, wherein contacting the adsorbent with the hydrogen permeate stream comprises flowing the hydrogen permeate stream in a counter-current direction relative to a flow direction of the first hydrogen stream or the reforming unit effluent.

Embodiment 6. The method of any one of the preceding embodiments, wherein the first hydrogen stream and second hydrogen stream have a total hydrogen input rate, and wherein the second hydrogen stream has a hydrogen flow rate that is at least about 80% of the total hydrogen input rate, preferably at least about 85%.

Embodiment 7. The method of any one of the preceding embodiments, wherein the hydrogen content of the hydrogen permeate stream is at least about 99.1% by volume, and wherein the hydrogen product stream has a pressure of at least about 95% of the pressure of the first hydrogen stream.

Embodiment 8. The method of any one of the preceding embodiments, wherein the cyclic adsorber unit is a rapid cycle pressure swing adsorber unit.

Embodiment 9. The method of any of the above embodiments, wherein one or more of the following are satisfied: the hydrogen content of the first hydrogen stream is about 75% or less, the hydrogen content of the second hydrogen stream is about 75% or less, the pressure of the second hydrogen stream is from about 870 psig (about 6.0 MPag) to about 2200 psig (about 15.2 MPag); and the pressure of the first hydrogen stream is from about 145 psig (about 1.0 MPag) to about 870 psig (about 6.0 MPag).

Embodiment 10. The method of any one of the preceding embodiments, wherein the cycling adsorber unit comprises a plurality of adsorbent beds, at least one of the plurality of beds being in a pressurization, depressurization, or purge portion of a cycle when at least one other bed is in a being exposed to the first hydrogen stream.

Embodiment 11. The method of embodiment 10, wherein said contacting of the adsorbent with the hydrogen permeate stream corresponds to a purge portion of the cycle.

Embodiment 12. The method of any one of the preceding embodiments, wherein contacting the adsorbent with the hydrogen permeate stream further comprises contacting the adsorbent with a recycled portion of the hydrogen product stream.

Embodiment 13. The method of any one of embodiments 3-12, further comprising: forming a tail gas at least in part from the hydrogen permeate stream after contact with the adsorbent; and compressing the tail gas stream to have a pressure greater than about 100 psig (about 0.7 MPag).

EXAMPLES

Example 1

A series of calculations were performed to determine the change in contamination in a hydrogen delivery network using different configurations of a pressure swing adsorber unit and a membrane separation unit for hydrogen recovery. In the following calculations, the hydrogen delivered to the separation units has a purity of about 75% by volume of $H_2$. The hydrogen can be separated using a membrane unit or a PSA unit, as described in the configurations below. Hydrogen recovered by the separation units can then be added back into the hydrogen network as described below. In the calculations, the recovery efficiency of hydrogen for the PSA unit was set at about 85%. The recovery efficiency for the membrane unit was set at about 90%. These recovery efficiencies are believed to be representative of typical performance for each type of unit.

A comparison was made between three different configurations. In the first configuration, only a PSA unit is used for hydrogen recovery. In the first configuration, the input flow to the PSA unit is about 50 MMSCFD, or millions of standard cubic feet per day (about 1350 kNm$^3$/day, or thousands of Normal cubic meters per day). The output hydrogen stream from the PSA unit can be added back to the hydrogen network. In the second configuration, both a PSA unit and a membrane unit are employed. The membrane can be operated to produce a hydrogen permeate stream with a pressure approximately comparable to the recovered hydrogen stream from the PSA unit. This can allow the hydrogen permeate stream from the membrane unit to be added to the hydrogen network without additional compression. The recovered hydrogen from both the PSA unit and the membrane unit can be added back to the hydrogen network. As shown in Table 1 below, the combined total input flow to both units was about 50 MMSCFD (about 1350 kNm$^3$/day). The third configuration also employs both a PSA unit and a membrane unit. The third configuration, however, allows for substantially complete (e.g., at least 99%) depressurization across the membrane, which can improve the purity of the permeate hydrogen stream. The permeate hydrogen stream can then be used as the purge gas for the PSA unit. The recovered hydrogen stream from the PSA unit can advantageously be the only hydrogen stream added to the hydrogen network. Using the hydrogen permeate stream to purge the PSA unit can increase the amount of the PSA recovered hydrogen stream available for addition to the hydrogen network.

Table 1 shows the hydrogen purity within the hydrogen network when the various configurations are used for hydrogen recovery. For each example in Table 1, the total input flow to the separation units is about 50 MMSCFD (about 1350 kNm$^3$/day). For these calculations, the pressure of the input flow to the PSA was set at about 380 psig (about 2.6 MPag). The pressure of the input flow to the membrane unit was set at about 1260 psig (about 8.7 MPag). The flow rate to the membrane unit was varied as indicated in Table 1. The amount of non-H$_2$ molecules returned to the hydrogen network is also shown in Table 1. This represents the amount of impurities added to the hydrogen network along with the recovered hydrogen. The amount of recovered hydrogen is also shown in Table 1.

TABLE 1

|  | Feed to PSA MMSCFD | Feed to Membrane MMSCFD | Non-H$_2$ to Network MMSCFD | High Pressure H$_2$ Recovered MMSCFD |
|---|---|---|---|---|
| PSA only | 50 | 0 | 0.32 | 31.9 |
| PSA + Membrane | 48 | 2 | 0.40 | 32.0 |
| (conventional) | 45 | 5 | 0.52 | 32.1 |
|  | 43 | 7 | 0.61 | 32.2 |
|  | 41 | 9 | 0.70 | 32.2 |
| PSA + Membrane | 48 | 2 | 0.26 | 32.0 |
| (according to | 45 | 5 | 0.18 | 32.1 |
| invention) | 43 | 7 | 0.13 | 32.2 |
|  | 41 | 9 | 0.09 | 30.8 |

For the PSA only calculation, the amount of hydrogen recovered represents a typical performance of about 85% recovery. The amount of non-H$_2$ added to the network is based on the PSA unit producing a hydrogen product with a purity of about 99% by volume.

For the conventional PSA plus membrane configurations, both the PSA and membrane units are operated to generate a hydrogen stream with a pressure of about 380 psig (about 2.6 MPag). The hydrogen stream from both the membrane unit and the PSA unit can then be added back to the hydrogen network. Although the membrane unit is being operated to produce a relatively high pressure stream, it is assumed in the above calculations that the membrane recovers about 90% by volume of the hydrogen from the input stream. As shown in Table 1, this conventional configuration results in increases in both the amount of hydrogen recovered and the amount of contaminants added to the hydrogen network. The increase in hydrogen recovered can be due to the higher efficiency for hydrogen recovery of the membrane unit. However, this higher efficiency can be accompanied by an increased amount of contaminants which enter the hydrogen network.

The final four rows of Table 1 show the benefit of a configuration according to the invention. In this configuration, the membrane can be operated to produce a hydrogen permeate stream at a pressure of about 50 psig (about 350 kPag). The flow of hydrogen to the membrane is about 2 MMSCFD (about 54 kNm$^3$/day), about 5 MMSCFD (about 140 kNm$^3$/day), about 7 MMSCFD (about 190 kNm$^3$/day), or about 9 MMSCFD (about 240 kNm$^3$/day), respectively. The corresponding input flow to the PSA unit is about 48 MMSCFD (about 1290 kNm$^3$/day), about 45 MMSCFD (about 1210 kNm$^3$/day), about 43 MMSCFD (about 1160 kNm$^3$/day), or about 41 MMSCFD (about 1110 kNm$^3$/day), respectively. The amount of hydrogen recovery is again assumed to be about 90%. However, with the additional pressure drop, the resulting permeate stream has a purity of about 99% by volume, comparable to the purity of the PSA hydrogen product. In this configuration, the membrane permeate stream can be used to form at least part of the purge stream for the PSA unit. As the amount of permeate stream increases, there can be a corresponding decrease in the amount of hydrogen taken from the PSA hydrogen product. Thus, even though the membrane unit is producing relatively low pressure hydrogen, this relatively low pressure hydrogen can reduce and/or eliminate the need to take the relatively high pressure PSA hydrogen product and form a relatively low pressure purge stream. As a result, this calculation shows the same net hydrogen recovery for the rows showing a feed to the membrane of about 2, about 5, or about 7 MMSCFD (about 54, about 140, or about 190 kNm$^3$/day, respectively). As shown in Table 1, for this hydrogen feed, the full amount of hydrogen for the purge stream can be provided by the permeate stream generated with a feed of about 7 MMSCFD (about 190 kNm$^3$/day) to the membrane. For the ~7 MMSCFD (~190 kNm$^3$/day) feed to the membrane, the amount of the PSA hydrogen product used for the purge stream is close to zero. Thus, increasing the membrane feed to about 9 MMSCFD (about 240 kNm$^3$/day) results in a net drop in recovered hydrogen.

Table 1 shows that attempting to add the hydrogen permeate stream directly to the hydrogen network can result in a substantial increase in the amount of contaminants in the network, relative to only having a PSA unit. By contrast, using a hydrogen permeate stream from a membrane unit as a purge for the PSA unit can increase the amount of hydrogen recovered by the PSA unit while also reducing the amount of contaminants in the hydrogen network.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for recovery of hydrogen in a refinery, comprising:
providing a first hydrogen stream having a hydrogen content of about 90% or less by volume and having a pressure from about 145 psig (about 1.0 MPag) to about 870 psig (about 6.0 MPag) from a first refinery process unit;
providing a second hydrogen stream having a hydrogen content of about 90% or less by volume at a pressure of at least about 580 psig (about 4.0 MPag) from a second refinery process unit;
performing a membrane separation on the second hydrogen stream to produce a hydrogen permeate stream having a hydrogen content of at least about 99.0% by volume, the hydrogen permeate stream having a pressure of about 100 psig (about 0.7 MPag) or less;
exposing the first hydrogen stream to an adsorbent in a cycling adsorber unit to produce a hydrogen product stream having a hydrogen content of at least about 99.0% by volume and a pressure of at least about 90% of the pressure of the first hydrogen stream;
contacting the adsorbent with the hydrogen permeate stream to regenerate the adsorbent;
forming a tail gas stream at least in part from the hydrogen permeate stream after contact with the adsorbent; and
compressing the tail gas stream to have a pressure greater than about 100 psig (about 0.7 MPag).

2. The method of claim 1, further comprising pressurizing the cyclic adsorber unit using at least a portion of the hydrogen product stream.

3. The method of claim 1, wherein contacting the adsorbent with the hydrogen permeate stream comprises flowing the hydrogen permeate stream in a counter-current direction relative to a flow direction of the first hydrogen stream.

4. The method of claim 1, wherein the first hydrogen stream and second hydrogen stream have a total hydrogen input rate, and the hydrogen product stream has a hydrogen flow rate that is at least about 80% of the total hydrogen input rate.

5. The method of claim 4, wherein the hydrogen product stream has a hydrogen flow rate that is at least about 85% of the total hydrogen input rate.

6. The method of claim 1, wherein the hydrogen content of the hydrogen permeate stream is at least about 99.1% by volume, and wherein the hydrogen product stream has a pressure of at least about 95% of the pressure of the first hydrogen stream.

7. The method of claim 1, wherein the cyclic adsorber unit is a rapid cycle pressure swing adsorber unit.

8. The method of claim 1, wherein the hydrogen content of the first hydrogen stream is about 75% or less by volume.

9. The method of claim 1, wherein the hydrogen content of the second hydrogen stream is about 75% or less by volume, and wherein the pressure of the second hydrogen stream is from about 870 psig (about 6.0 MPag) to about 2200 psig (about 15.2 MPag).

10. The method of claim 1, wherein the cycling adsorber unit comprises a plurality of adsorbent beds, at least one of the plurality of beds being in a pressurization, depressurization, or purge portion of a cycle when at least one other bed is being exposed to the first hydrogen stream.

11. The method of claim 10, wherein said contacting of the adsorbent with the hydrogen permeate stream corresponds to a purge portion of the cycle.

12. The method of claim 10, wherein contacting the adsorbent with the hydrogen permeate stream further comprises contacting the adsorbent with a recycled portion of the hydrogen product stream.

13. A method for recovery of hydrogen in a refinery, comprising:
receiving a hydrogen-containing effluent from a reforming unit, the reforming unit effluent having a hydrogen content of about 90% or less by volume;
contacting the reforming unit effluent with an adsorbent in a cycling adsorber unit to produce a hydrogen product stream having a hydrogen content of at least about 99.0% by volume and having a pressure of at least about 95% of a pressure of the reforming unit effluent;
receiving a gas phase effluent from a hydroprocessing unit, the hydroprocessing unit effluent having a hydrogen content of about 90% or less by volume;
performing a membrane separation on the hydroprocessing unit effluent to produce a hydrogen permeate stream and a retentate stream, the hydrogen permeate stream having a hydrogen content of at least about 99.0% by volume and a pressure of about 100 psig (about 0.7 MPag) or less; and
contacting the adsorbent with the hydrogen permeate stream to regenerate the adsorbent.

14. The method of claim 13, wherein the reforming unit effluent has a pressure from about 145 psig (about 1.0 MPag) to about 870 psig (about 6.0 MPag).

15. The method of claim 13, wherein the hydroprocessing unit effluent has a pressure of at least about 580 psig (about 4.0 MPag).

16. The method of claim 13, wherein the hydroprocessing unit effluent has a pressure from about 870 psig (about 6.0 MPag) to about 2200 psig (about 15.2 MPag).

17. The method of claim 13, wherein the pressure of the hydrogen product is at least 98% of the pressure of the reforming unit effluent.

18. The method of claim 13, further comprising:
forming a tail gas at least in part from the hydrogen permeate stream after contact with the adsorbent; and
compressing the tail gas stream to have a pressure greater than about 100 psig (about 0.7 MPag).

19. The method of claim 13, wherein the cycling adsorber unit is a pressure swing adsorber unit or a rapid cycle pressure swing adsorber unit.

20. The method of claim 13, wherein a flow rate of hydrogen in the reforming unit effluent plus a flow rate of hydrogen in the hydroprocessing unit effluent correspond to a total hydrogen input rate, and the flow rate of hydrogen in the hydrogen product stream is at least about 85% of the total hydrogen input rate.

21. The method of claim 1, wherein first refinery process unit is selected from a reforming unit, a coking unit, and an FCC unit.

22. The method of claim 21, wherein second refinery process unit is a hydroprocessing unit.

* * * * *